United States Patent
Pareek et al.

(10) Patent No.: US 9,756,119 B2
(45) Date of Patent: Sep. 5, 2017

(54) APPARATUS AND METHOD FOR PIPELINED EVENT PROCESSING IN A DISTRIBUTED ENVIRONMENT

(71) Applicant: WebAction, Inc., Palo Alto, CA (US)

(72) Inventors: Alok Pareek, Hillsborough, CA (US); Ali Kutay, Palo Alto, CA (US); Steve Wilkes, Santa Clara, CA (US); Sami Akbay, Santa Clara, CA (US)

(73) Assignee: Striim, Inc., Palo Alto, CA (US)

( * ) Notice: Subject to any disclaimer, the term of this patent is extended or adjusted under 35 U.S.C. 154(b) by 406 days.

(21) Appl. No.: 14/285,428

(22) Filed: May 22, 2014

(65) Prior Publication Data

US 2014/0358982 A1    Dec. 4, 2014

(51) Int. Cl.
G06F 17/30 (2006.01)
H04L 29/08 (2006.01)
H04L 12/24 (2006.01)

(52) U.S. Cl.
CPC .......... H04L 67/10 (2013.01); H04L 41/0604 (2013.01)

(58) Field of Classification Search
CPC .............. G06F 17/30; G06F 17/30038; G06F 17/30516; G06F 11/3476; G06F 17/30551
USPC ................................................. 707/608, 694
See application file for complete search history.

(56) References Cited

U.S. PATENT DOCUMENTS

| | | | | |
|---|---|---|---|---|
| 7,321,939 B1* | 1/2008 | Porter | ...... | G06F 9/546 709/217 |
| 8,341,131 B2* | 12/2012 | Cohen | ...... | G06F 17/30303 707/694 |
| 8,943,059 B2* | 1/2015 | Rozenwald | ....... | G06F 17/30303 707/737 |
| 2006/0136391 A1* | 6/2006 | Morris | ............. | G06F 17/30864 |
| 2006/0218116 A1* | 9/2006 | O'Hearn | ................ | G06Q 10/06 |
| 2006/0287890 A1* | 12/2006 | Stead | ...................... | G06Q 50/24 705/3 |
| 2007/0299885 A1* | 12/2007 | Pareek | ............. | G06F 17/30563 |
| 2009/0030943 A1* | 1/2009 | Kall | .................... | H04L 41/0226 |
| 2011/0283045 A1 | 11/2011 | Krishnan et al. | | |
| 2012/0072464 A1* | 3/2012 | Cohen | .............. | G06F 17/30303 707/803 |
| 2013/0006718 A1 | 1/2013 | Nielsen et al. | | |

(Continued)

OTHER PUBLICATIONS

International Search Report and Written Opinion issued to PCT Application No. PCT/US14/39240, Sep. 24, 2014, 9 pgs.

*Primary Examiner* — Debbie Le
(74) *Attorney, Agent, or Firm* — Cooley LLP

(57) ABSTRACT

A method includes receiving first data from a first data source that continuously generates a first set of records with first common fields. The first data is filtered by selecting a first sub-set of fields of the first common fields to form first filtered data. Second data is received from a second data source that continuously generates a second set of records with second common fields. The second data is filtered by selecting a second sub-set of fields of the second common fields to form second filtered data, where the first filtered data and the second filtered data are generated simultaneously. Rules are applied to the first filtered data and the second filtered data in real-time to identify selected real-time events. The selected real-time events are reported prior to persistently storing the first filtered data, the second filtered data and the selected real-time events.

20 Claims, 7 Drawing Sheets

(56) References Cited

U.S. PATENT DOCUMENTS

2013/0166552 A1\* 6/2013 Rozenwald ......... G06F 17/3071
707/737

\* cited by examiner

US 9,756,119 B2

APPARATUS AND METHOD FOR PIPELINED EVENT PROCESSING IN A DISTRIBUTED ENVIRONMENT

CROSS-REFERENCE TO RELATED APPLICATION

This application claims priority to U.S. Provisional Patent Application Ser. No. 61/826,377, filed May 22, 2013, the contents of which are incorporated herein by reference.

FIELD OF THE INVENTION

This invention relates generally to the analysis of data. More particularly, this invention relates to techniques for pipelined event processing in a distributed network environment.

BACKGROUND OF THE INVENTION

FIG. 1 illustrates a prior art technique for analyzing data. A data source 100_1, such as a relational database, may have its data migrated to a persistent data store 104 through the use of an Extract, Transform and Load (ETL) module 102_1. As its name implies, an ETL module extracts data, transforms the data to a specified format and then loads it into the persistent data store. Additional data sources 100_2 through 100_N may be processed in a similar manner to augment the persistent data store 104. Thereafter, a query engine 106 may be used to apply ad hoc queries to the persistent data store 104.

Prior art systems of this type require data to be migrated and stored persistently prior to analysis. As the number of data sources proliferates there is a growing need to analyze data prior to migration and persistent storage.

SUMMARY OF THE INVENTION

A method includes receiving first data from a first data source that continuously generates a first set of records with first common fields. The first data is filtered by selecting a first sub-set of fields of the first common fields to form first filtered data. Second data is received from a second data source that continuously generates a second set of records with second common fields. The second data is filtered by selecting a second sub-set of fields of the second common fields to form second filtered data, where the first filtered data and the second filtered data are generated simultaneously. Rules are applied to the first filtered data and the second filtered data in real-time to identify selected real-time events. The selected real-time events are reported prior to persistently storing the first filtered data, the second filtered data and the selected real-time events.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
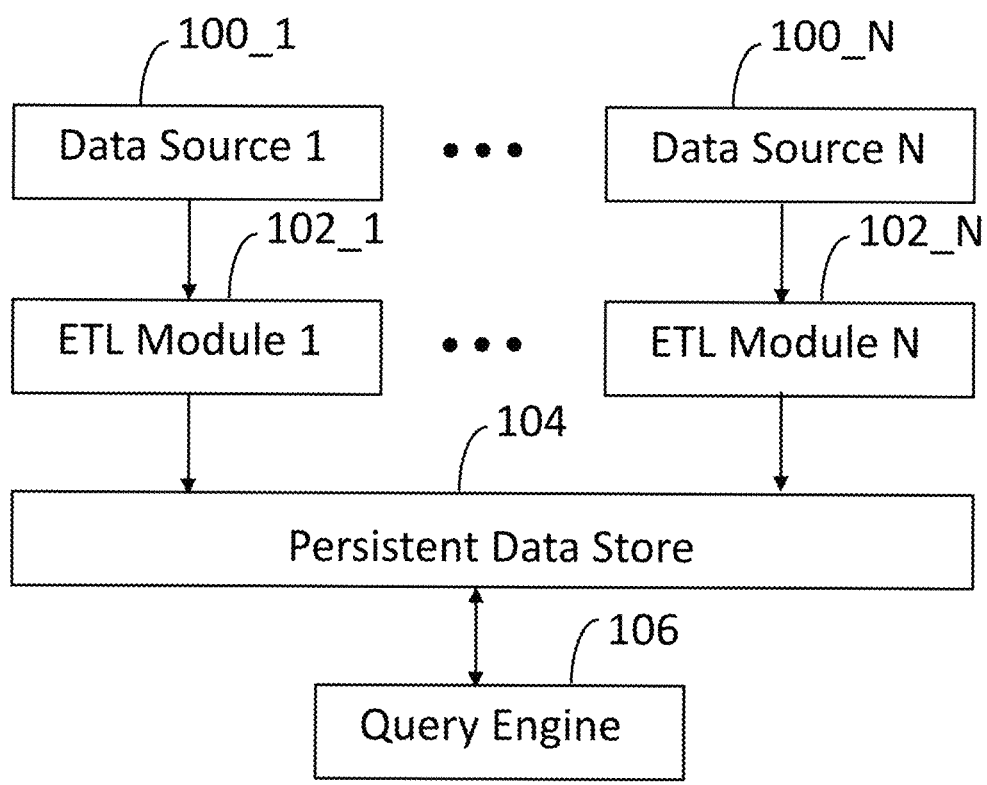
FIG. 1 illustrates a prior art data analysis system.
Figure 2:
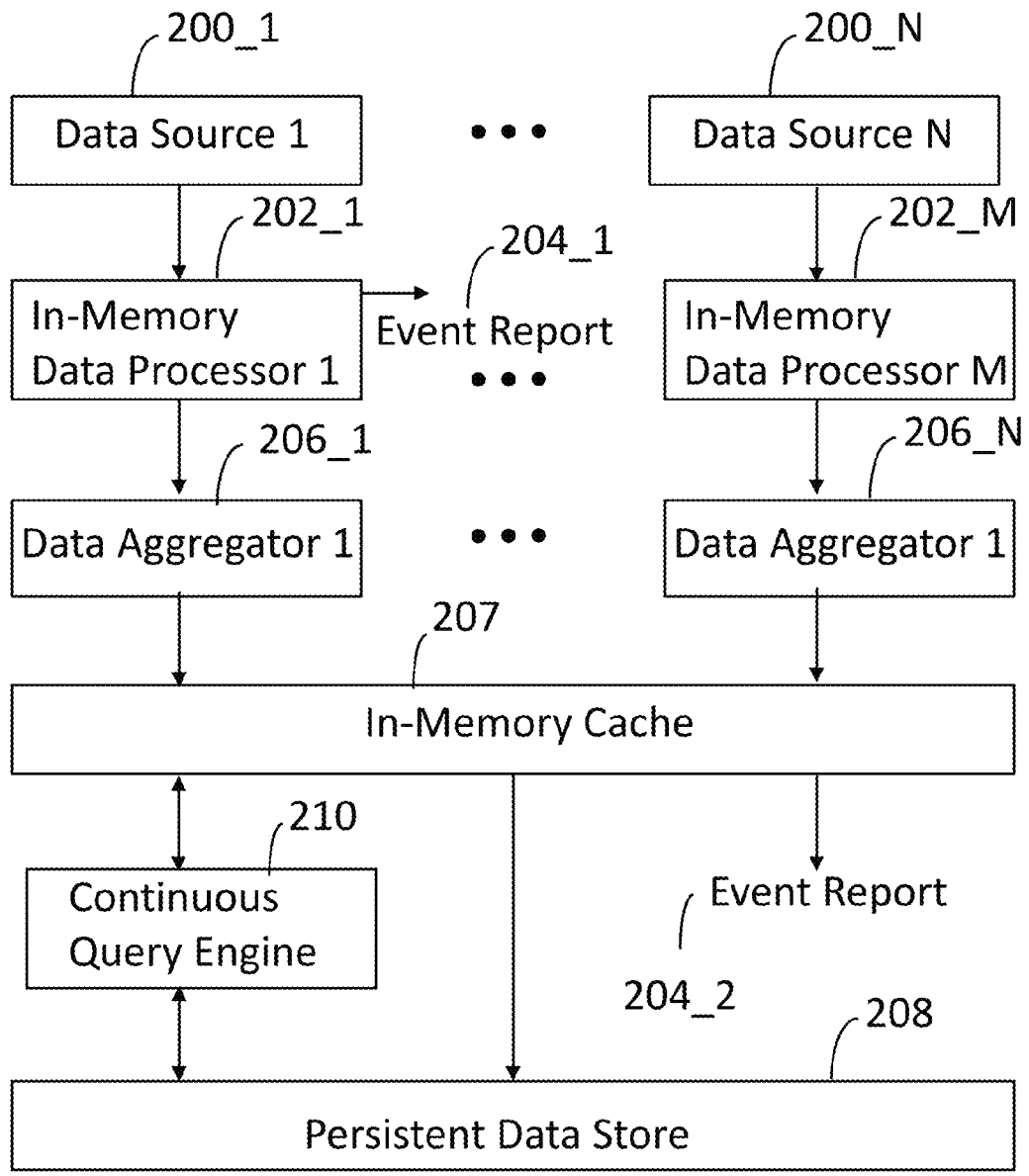
FIG. 2 illustrates a data processing system configured in accordance with an embodiment of the invention.

FIG. 2 illustrates a data processing system configured in accordance with an embodiment of the invention. A persistent data store 208 stores data from a variety of data sources 200_1 through 200_N. Each data source may be structured (e.g., relational) data, unstructured data or semi-structured data. In-memory data processors 202_1 through 202_M process data as it is routed to the persistent data store 208 and periodically report events 204. The numbers N and M may be equivalent or different. That is, there may be a one-to-one mapping between data sources and in-memory data processors or individual in-memory data processors may receive data from multiple data sources.

Thus, "in-flight" data is analyzed and reported prior to arrival in the persistent data store 208. Data aggregators 206_1 through 206_N augment the raw data with derived data, metadata and other parameters obtained by the in-memory data processors, as discussed in detail below. A data aggregator may also emit an event report.

An in-memory (volatile memory) cache 207 stores data received from the data aggregators 206. A continuous query engine 210 applies continuous queries to the in-memory cache 207 to generate event reports 204_2. Observe here that the invention provides for continuous queries across distributed data sources, effectively providing distributed continuous query processing. The continuous query engine 210 may also be used for ad hoc queries applied to the persistent data store 208.

FIG. 2 is an exemplary configuration for an in-memory data processor 202. A distributed Data In Motion (DIM) processor 300 receives data from a data source on port 301. The DIM processor has access to an event cache 302 and an historical data cache 304 that supports long running queries, as discussed below. The processor 300 is distributed in the sense that it resides on many nodes in a network. The processor 300 may operate autonomously on its node or in a distributed manner with a processor on another node.

The processor 300 accesses a distributed Web Action (WAction) cache 306. The WAction cache 306 corresponds to the in-memory cache 207 of FIG. 2. The cache 306 is dynamic memory for temporarily storing in-flight data. The cache 306 may have an associated WAction store 308, which is a persistent data store for original in-flight data that is augmented with derived data, aggregated data, metadata and other parameters in accordance with the invention, as detailed below. The WAction store 308 corresponds to the persistent data store 208 of FIG. 2.

Figure 4:
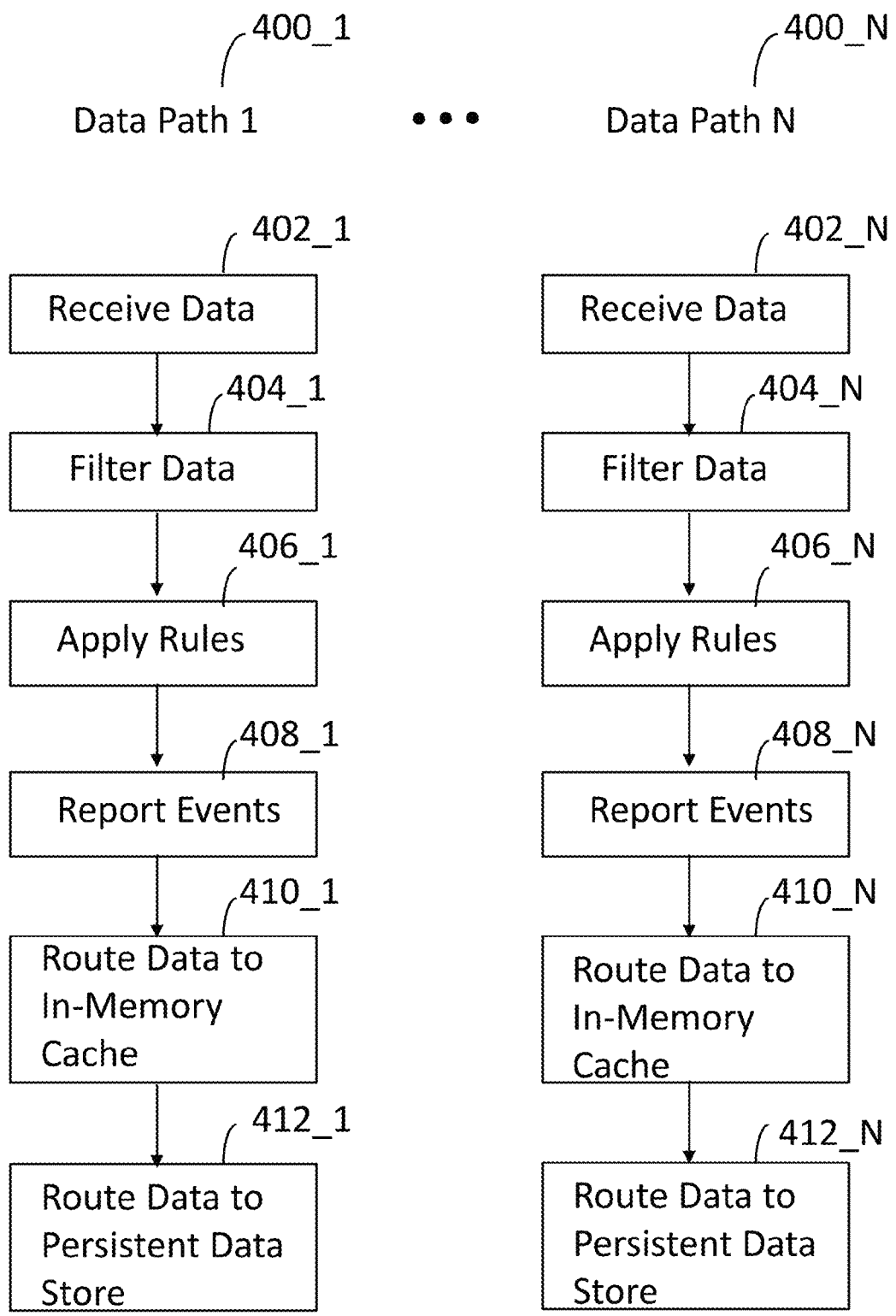
FIG. 4 illustrates data path processing associated with an embodiment of the invention.

FIG. 4 illustrates distributed data path processing associated with an embodiment of the invention. In particular, the figure illustrates data paths 400_1 through 400_N. Each data path receives data 402, such as from a data source 200. The data is filtered 404, as discussed in detail below. Rules are then applied to the data 406. As discussed below, the rules may be used to detect data points and correlate data. Events are then selectively reported 408. The data is routed to an in-memory cache 410 and ultimately to the persistent data store 412. This distributed processing is performed on parallel paths across a network.

Figure 5:
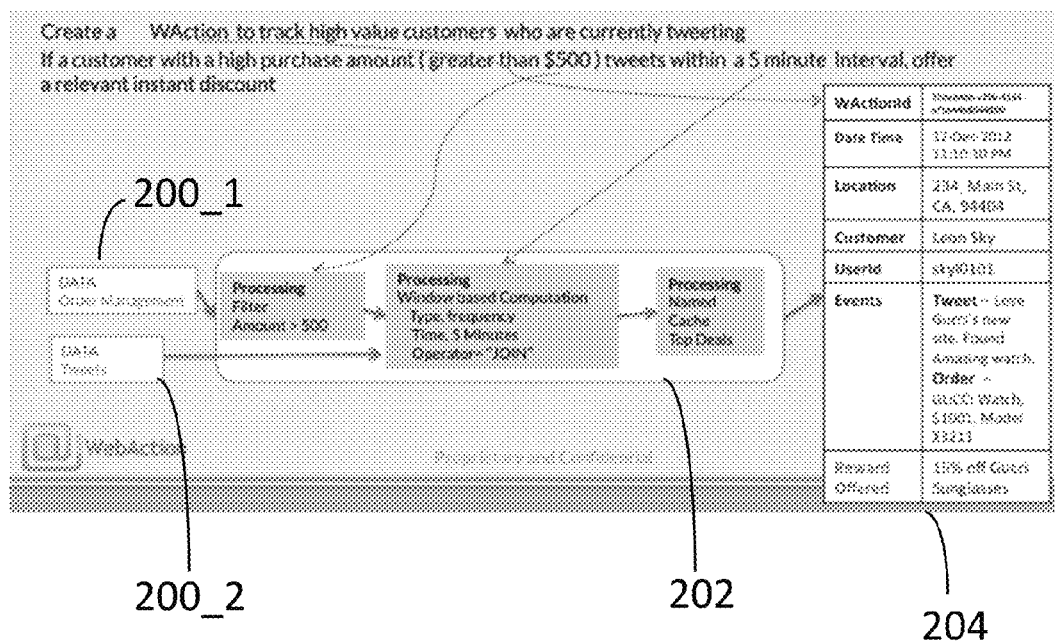
FIG. 5 is an example of data processing from multiple sources in accordance with an embodiment of the invention.

FIG. 5 illustrates data processing performed in accordance with an embodiment of the invention. A first data source 200_1 has transactional data related to ordering merchandise, while a second data source 200_2 is an unstructured data feed, in this case Tweets® from the social network Twitter®.

An in-memory data processor 202 executes instructions to identify high value customers who are currently issuing Tweets®. Thus, the data processor 202 is analyzing disparate data feeds in real time to detect and correlate events. The disparate data feeds may be processed along separate data paths where rule based operations are performed and communicated across the separate data paths. When the rules are satisfied, an event report 204 is created. Characteristics of event reports are discussed below.

The invention facilitates the processing of large volumes of data in a highly scalable, distributed manner over commodity hardware. Businesses deploy data driven applications on the platform for real-time analytics. At a fundamental level, it can be considered a decentralized, pipelined event processing system that ingests external data in the form of events, processes data events using a distributed, continuous query-processing engine, and delivers the processed results to applications. The results represent a collation of continuous real-time data activity across disparate sources.

Key differentiators of the platform are acquisition of real-time data (event data) from a large variety of data sources (transactional and non-transactional) using fast, out of the box adapters; data collation with flexible persistence policies over static and unbounded event sets using relational and stream like operators; real-time data integration across existing and emerging computing platforms—for in-memory processing, as well as analytical processing, storage of correlated data via a new data model. The new data model is sometimes referred to as a Web Action or WAction. Individual WActions may ultimately be stored in a data structure called a WActionStore. A simple declarative programmatic interface creates event flows to create, store, and search for WActions.

The WAction platform has a new data model to track data that represents related real-time activity. This new model can be backed by a physical (stored) data model. The WAction data model allows for related events (where the relation is based upon user specified rules) to be tracked together in memory and storage for purposes of search, aggregation, visualization, exceptions, and other application uses.

The WActionStore is a namespace that contains a logical grouping of related WActions in either dynamic memory or persistent storage. WActionStores can be queried in real time to create applications for a wide variety of business purposes.

Distributed processing of real-time data feeds from a multitude of data sources is rapidly becoming an enterprise requirement due to new data management problems fueled by exponential growth in machine generated data, sensor data, social data, and transactional data. From a technology standpoint, this is causing a shift from storage centric architectures to event centric architectures, as well as creating new processing requirements (cost and performance criteria) to support a high variety of events being generated.

Traditional event processing systems (often referred to as complex event processing or CEP systems) running on large symmetric multiprocessor servers have three key problems when processing a latency sensitive workload on a large set of events. First, the system scale up cost in light of heavy data volumes has become prohibitively expensive. Second, the ceiling on the number of cores per system inherently limits overall scalability. Finally, complexity in collating events across a variety of data sources requires sophisticated data scientists since current CEP engines usually offer low level programming models. As a result of these three problems, event flows built on top of these systems are inflexible, do not easily integrate with other systems and are difficult to maintain over time.

WAction is an integrated, distributed, real-time data management platform that aims to address these cost, performance, and data management challenges by providing a high throughput, low latency, easy to use event processing engine that runs on commodity hardware clustered horizontally for scalability.

A key gap in event processing systems today is the ability to monitor ongoing transactions for the purposes of real-time enrichment and analytics. Most available event processing solutions offering sophisticated analytical models either provide descriptive analytics (business rules built using historical data clustered into groups—addressing questions about what happened in the business, or creating a ranking amongst the customer base (e.g., categories like premium customers, top spenders etc.)), or predictive analytics (business rules built using historical data to model and classify data for future predictions—these address questions such as how likely is the customer to default on a loan, or how to improve the effectiveness of ad campaigns etc.).

There are certain technologies that enable real-time decision-making through a combination of data mining and business rules. However, these technologies are geared towards adjusting recommendations and model changes using heuristic business rules for decision management on a real-time contextual basis over static data. What is lacking is the ability to continuously run analytics on events and transactions as they occur for correlation, enrichment, tagging, visualization and search purposes.

A straightforward example of running continuous analytics over transactions is to answer a simple but extremely sophisticated query such as "What is my real-time single enterprise view of a given customer?" The analytics should consider data from transactional and additional big data sources.

Another motivation to create the WAction platform is to allow for real-time integration of big data. Currently emerging platforms and technologies (e.g., Hadoop®, Hana®, etc.) largely process semi-structured and loosely structured data over batched data sets. Combining transactional data with big data in real-time continues to be a challenge.

A key component of big data is the accelerated growth in data volumes and the velocity with which such data is being generated. This accelerated growth in transactional data volumes, both from a write as well as read standpoint due to internet-scale activity are resulting in new performance challenges on back end database systems. One way to alleviate the load on these databases that are extremely sensitive to write throughput and query response times is to offload processing to other servers via data partitioning and replication techniques. This category of back end systems may be termed mission critical systems. These back end enterprise systems can be further classified depending on business function (e.g., as on-line transaction processing (OLTP), on-line analytical processing (OLAP), reporting, Business Intelligence etc.), or based on data organization models, such as transactional systems, corporate data warehouses, operational data stores, data hubs and big data analytic systems.

Over the last decade, several database vendors have introduced efficient log mining APIs and data distribution mechanisms to deliver logical changes using decoupled Capture and Apply processing from one transactional system into another for the purposes of partitioning, replication and integration. This has been a significant advance from the earlier data integration technologies that largely relied on ETL. Use of log mining APIs to deliver Change Data Capture rather than ETL in data distribution applications can alleviate resource consumption on the data generation environment and reduce data propagation latency for further downstream processing. There remain significant design complexities however in managing Change Data Capture in client managed mining applications. Component handling queuing, persistence, failure handling, and apply side scalability are some of the design complexities.

Certain database vendors have introduced real time data integration solutions to address these complexities. However, they do not offer such integration with newly emerging big data compute platforms (e.g. Apache Hadoop® a popular open source map-reduce implementation that utilizes commodity hardware to process extremely large data sets). A direct limitation therefore is the ability to continuously integrate data from mission critical application environments running critical customer care, healthcare, security, fraud applications deployed against popular commercial back end database systems like IBM®, Oracle®, SQL Server etc., and delivering the changes into big data computing platforms such as Hadoop®. This delivery is critical to analysis of all log processing—web logs and transaction logs rather than simply log processing and analysis which appears to be primarily the predominant use case for Hadoop® clusters today. Combining data across a variety of logs for analysis and distributed processing is currently a serious big data challenge for both data integration and real time analytics.

To solve these problems the WAction platform aims to acquire, map, process, enrich and deliver transactional data from the aforementioned mission critical systems in real time into Hadoop® (and related) systems for continuous collection and analytics of big data for building superior business intelligence applications.

An event E of type T is defined as a combination of data and an associated timestamp. The data component in E comprises a fixed sequence of data elements $\{d_1, d_2 \ldots d_n\}$, where each data element $d_i$ is of a certain type $t_i$. The event type T is a composite type that is described as a sequence of all the types corresponding to the type of each data element $d_i$. In WAction, data elements can be over user-defined types, or primitive types such as string, integer etc. Data elements are not restricted to a relational model. Support for nested types is permitted.

In a majority of cases, events additionally have a timestamp that corresponds to the time when the event was generated by some application at some data source. In the WAction platform events are injected into the platform from external data sources such as files, queues, databases, social media feeds, devices etc.

A data stream or simply a stream represents a continuous, potentially unbounded set of events of the same composite type in increasing timestamp order. The time ordered set of these events is considered as a stream, data stream, or event stream (all used interchangeably). Each stream may move along a data path, such as shown in FIG. 4.

A data source is the external source of the streams (and indirectly events). Examples of data sources are database systems, operating systems, applications, web servers, application servers, devices, sensors etc. More particularly, the invention is operable with various logs that continuously emit events, such as a database log, a database redo log, an operating system log, an application log, a web server log, an application server log and a machine generated log.

Each data source may be characterized by the records or fields that it generates. Each record or field has an associated data type, such as alpha-numeric, numeric, character, date, character string and the like. Consider the following data generated by an Apache web server log.

216.103.201.86 - EHernandez [10/Feb/2014:12:13:51.037 -0800] "GET http://cloud.saas.me/login&jsessionId=01e3928f-e059-6361-bdc5-14109fcf2383 HTTP/1.1" 200 21560 "-" "Mozilla/5.0 (compatible; MSIE 9.0; Windows NT 6.0; Trident/5.0)" 1606

The value "216.103.201.86" is an IP address. "EHernandez" is a user name. Next is a time stamp. A "GET" command is specified as another field. The last field is a browser type. Thus, a schema for this data source may be specified as follows:

| FIELD | TYPE |
| --- | --- |
| IP Address | Numeric |
| User Name | Character String |
| Command | Alpha-numeric String |
| Browser | Alpha-numeric String |

Data may then be filtered by specified fields. Rules may then be applied to the filtered data to report events of interest.

Consider the case of event instances from a data source of type relational database. In this example the events are derived from a data stream that gets created with the transaction log of the database as the data source.

COMPANY1,D6RJPwyuLXoLqQRQcOcouJ26KGxJSf6hgbu, 6705362103919221351,0,20130430122956,0916,USD, 570.58,5150279519809946,44845,Melmore Thus, this data source generates records with the following comma separated format: business name, merchant ID, primary account number, point of sale data code, date time, expiration date, currency code, authorized amount, terminal ID, zip code and city. An appropriate schema with fields and data types may be specified to characterize this information.

Consider an example of event instances from an application server log where the log 4j[3] API is used to generate the log events. In this example the events are stored in XML format.

log4j:locationInfo class="com.me.saas.SaasMultiApplication" method="login" file="SaasMultiApplication.java" line="1267"/>
</log4j:event>
<log4j:event logger="SaasApplication" timestamp="1392063232487" level="INFO" thread="main">
<log4j:message><![CDATA[API Call completed [api=create] [session=01e3928f-e059-6361-bdc5-14109fcf2383] [user=EHernandez] [sobject=Partner]]]></log4j:message>

Once again an appropriate schema with fields and data types may be specified to characterize this information, such as log 4j:event/@timestamp, log 4j:event/@level, log 4j:event/log 4j:message, log 4j:event/log 4j:locationInfo?@method.

Figure 3:
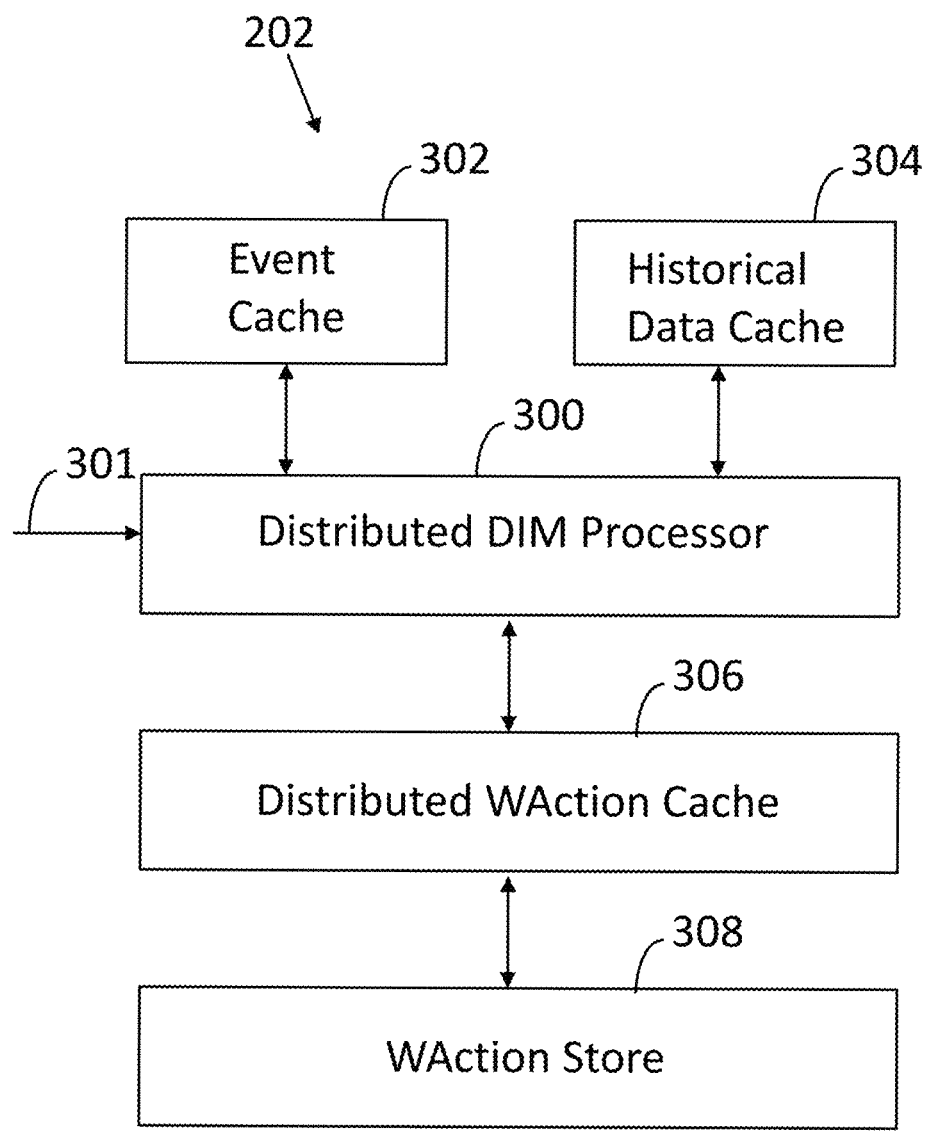
FIG. 3 illustrates an in-memory data processor configured in accordance with an embodiment of the invention.

A flow in WAction represents a design time construct that describes an end-to-end data processing pipeline, as shown in FIG. 4. The pipeline consists of data sources, adapters that read data from the sources and convert them into events, event processing components executing computing functions, and data targets that consume the data for storage, processing, alerting or visualization purposes. Each flow or data path has a data input of real-time event data from various adapters depending on different sources of data. Streams define the flow of data among the other components. Windows bound the event data by time or count. Continuous queries filter, aggregate, join, enrich, and transform the data. The distributed DIM processor 300 of FIG. 3 may be used to execute the continuous queries. An event cache 302 or historical data cache 304 may be used to enrich the event data. Results of continuous queries may be stored in cache 306 or on disk as a WAction store 308. WAction stores may be used to populate the built-in reports and visualizations and persist the WActions. Targets may be used to pass data to external real-time applications and trigger alerts.

A data source group allows for multiple sources having the same composite type (schema) to be logically grouped together and processed as a single stream to simplify data flow design. For example, if an ATM application is deployed at multiple branches of a bank, then rather than define one flow per branch to acquire data from each branch application, a data source can be associated with a group to automatically publish the data from all data sources belonging in that group into a single data stream.

Once external (raw) events are injected into the WAction platform via a reading component, a WAction Translation Format (WTF) converts the external event into an internal canonical object representation for further processing. This internal object representation may be referred to as a WAEvent (read as Web Action Event).

A WAEvent is an object that contains sub-objects (WAEventID, WAEventPayload) where a WAEventID is a unique identifier within WAction and WAEventPayload contains the external event of some composite type.

| Attribute | Mandatory | Comments |
| --- | --- | --- |
| WAEventId | Yes | Unique Identifier - Doesn't need to be globally unique |
| WAEventCreationTime | Yes | This could be WebAction generated or generated at the event source (i.e. application induced) |
| WAMetadataObject | No | Source Dependent Metadata e.g. Source IP, Hostname, DB Name, Table Name, Operation Type etc. |
| WAEventPayload | Yes | Data |

Software applications get deployed on the WAction platform using event flows. Generally speaking, WActions describe related or correlated "events of interest" as a singular real-time happening. Specifically, WActions represent objects that have a common, logical, data model that contains objects representing data from the related events, associated context (raw, or derived), event correlations, computed aggregates, and some additional system, and user generated metadata for purposes of search, analytics, communication, storage and visualization.

Figure 6:
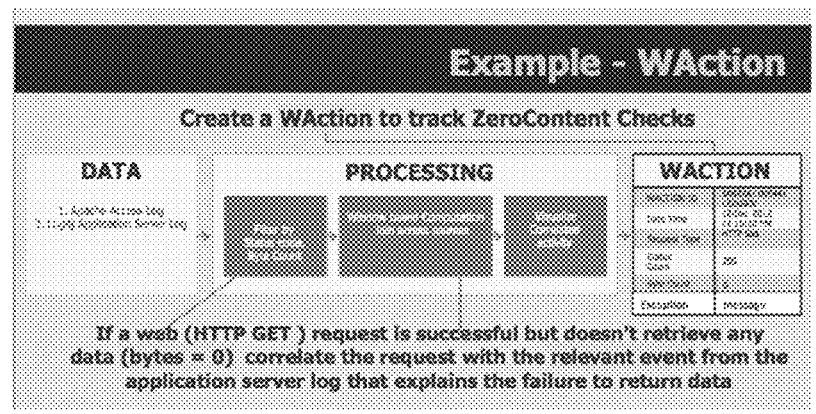
FIG. 6 is another data processing example in accordance with an embodiment of the invention.
Figure 7:
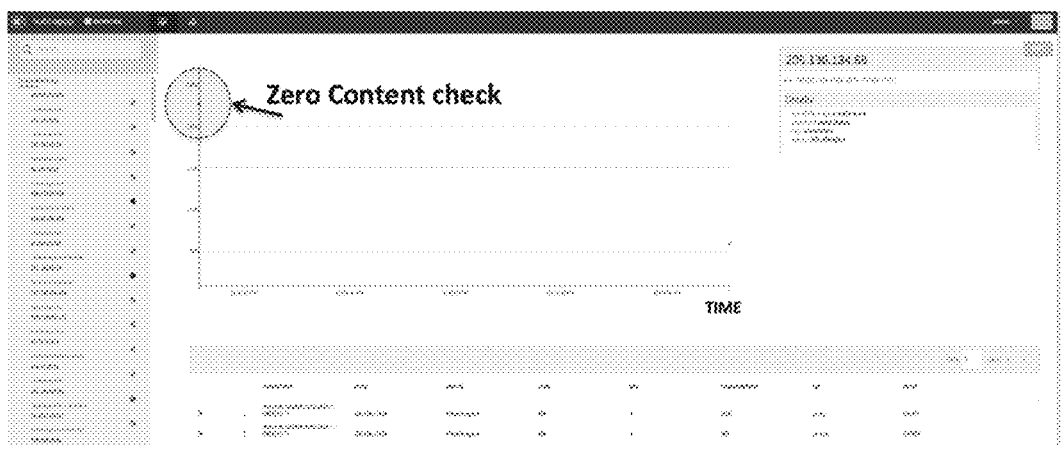
FIG. 7 is an example of an object created in response to the processing associated with FIG. 6.
Figure 8:
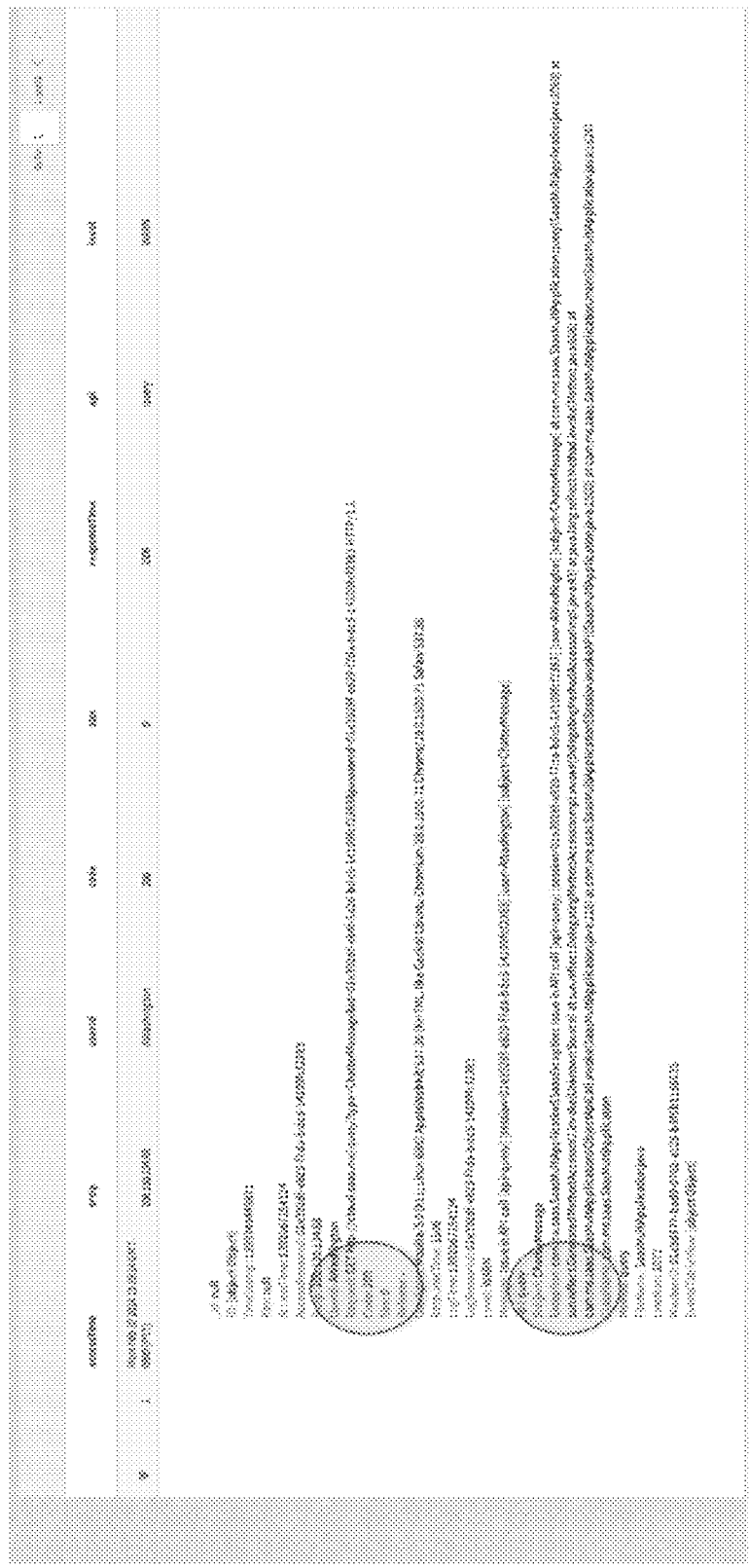
FIG. 8 illustrates raw events associated with the processing performed by the object of FIG. 6.

The WAction realization is illustrated using the example of FIG. 6 where events across two disparate data sources are processed in-memory using continuously running queries. The events need to be correlated such that the resultant object conveys the relationship of the two events in an object that can be subsequently manipulated programmatically. FIG. 7 is an example of a real WAction object created in the WAction platform in response to the WAction object of FIG. 6. FIG. 8 lists a real WAction object detailed view of the raw events that are part of the same WAction. In one embodiment, the WAction object has the following data model:

| Attribute | Type | Mandatory | Comments |
| --- | --- | --- | --- |
| ID | long | Yes | Global Unique Identifier |
| Creation Time | DATE TYPE | Yes | System (WAction) Generated |
| Location_List | Object {<k,v.} | No | 0, 1, or more objects to hold location based data e.g. Latitude, Longitude, Geo Coordinates |
| Context | Object {<k,v>} | No | User specified fields/schema. A set of zero, one or more key value pairs |
| Events | Object {<k,v>} | No | A set of zero, one or more events with associated metadata (raw from original source, or composite events based on correlation operators such as conjunction, disjunction, sequence, or other such logical operators etc. relevant to the WAction - a set of key value pairs, and metadata. |

A WActionStore is a collection of WActions. A WActionStore contains WActions—the results of rules based processing within the WAction server. Typically WActions represent aggregated data and/or anomaly data, but could arbitrarily be used to denote any kind of activity based on application-defined logic. The WActionStore defines the data model for the WAction objects, and how WActions are persisted to a backend data store for longer-term duration. The following syntax shows how a WActionStore may be created.

```
CREATE WACTIONSTORE <WActionStoreName>
CONTEXT OF <Type> [EVENT TYPES ( <Type>
KEY ( <TypeField> ) ) ]
  PERSIST { NONE|IMMEDIATE|
  EVERY int {SECOND|MINUTE|HOUR|DAY}}
  USING (
    <property set>
  )
```

The WAction platform has a data definition and manipulation language that is used to define the context fields of the WActionStore, along with additional policies for persistence and the like for the WActions. The correlation and aggregation over the events from various data sources is performed by a data-in-motion processing engine that takes in processing rules using a declarative query processing language (similar to SQL) and additional language extension operators and data collection can be performed over a number of data sources that could be structured data, relational data sets, semi-structured (e.g., database transaction logs, web server logs), machine logs, device logs, network data and the like.

WAction rules allow for rule based processing over unbounded data sets. This is in effect one of the main differentiators of the technology. Embodiments of the invention may use both sliding (window moves forward at both end points) and landmark windows (initial time is fixed but end time is unbounded). Windows are in-memory constructs that hold data (streamed events) for a specified amount of time or count or both.

Storage of WActions is user configurable. There is a persistent layer to support writing of WActions to an underlying datastore. NOSQL systems are best suited as the underlying storage system for WActions. A Stored WAction should contain sufficient metadata to reference each of the events that participated in creation of the WAction. This metadata is persisted as part of the WAction.

In a class of use cases it may be desirable though not necessary to store every event payload that is part of the WAction. For example, in use cases where real time aggregated data are being computed and analyzed, writing events or WAction payloads in the absence of any interesting patterns seems costly. WAction storage without the WAction payloads is deemed sufficient to satisfy business requirements for these cases. In other cases where the WAction is interesting (e.g., triggers a rule based alert etc.) persisting entire events may be necessary.

The techniques of the invention may be used for various event aggregations.

For example, the techniques of the invention may be used for constructing real-time in-memory aggregates over event data with data coming from transactional systems, and non-transactional systems such as database logs, application server logs, web server logs, or database tables. Comparisons of in memory aggregates with historical averages may be used to detect unusual activity. New axes of data may be created through temporal (time stamp) tags or GeoSpatial (e.g., zip code) tags.

The techniques of the invention may also be used for event collation and correlation. For example, multiple events may be combined using SQL, statistical, arithmetic, or user defined operators. Transactional and non-transactional event sources (e.g., social data feeds) may be joined.

The techniques of the invention allow for flat file integration with a Hadoop® Distributed File System. For example, data from transactional systems may be loaded into a Hadoop® Distributed File System using change data capture via flat files. Currently there are no widely adopted real time change data capture products that can be used to deliver continuous transactional feeds into a Hadoop® Distributed File System.

Techniques of the invention may be used for real time transaction processing into a large data store, such as Hive® or Spark®. Hive® is the data warehouse for Hadoop® that allows for data summarization, ad-hoc queries, and analysis of large datasets (that are stored in underlying Hadoop® compatible file systems).

Techniques of the invention may also be used for real time transaction processing using NoSQL. A NoSQL or Not Only SQL database provides a mechanism for storage and retrieval of data that is modeled in means other than the tabular relations used in relational databases. Increasingly, due to the Hadoop® Distributed File System's append only limitations, applications are beginning to leverage Apache® Hbase® to meet requirements for updates at arbitrary data offsets. The requirements for the scenario are to integrate data (full, subset) from transactional systems into NoSQL systems, such as Hbase®, Cassandra® and MongoDB®. Hbase® provides for fast record lookups and updates for large data sets and is available as part of Hadoop® distribution. Techniques of the invention may also be used for real time NoSQL stream processing. That is, data may be acquired from NoSQL data stores for real time processing. Techniques of the invention may also be used for real time Hadoop® Distributed File System stream processing.

The following code is a sample application that demonstrates how a credit card payment processor might use a WAction to generate reports on current transaction activity by a merchant and send alerts when transaction counts for a merchant are higher or lower than average for the time of day.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
receiving first data from a first data source that continuously generates a first set of records with first common fields, wherein the first set of records characterize a first real-lime event,
filtering the first data by selecting a first sub-set of fields of the first common fields to form first filtered data, wherein filtering the first data includes accessing in dynamic memory the first data stored as in-flight data;
receiving second data from a second data source that continuously generates a second set of records with second common fields, wherein the second set of records characterize a second real-time event different than the first real-time event, filtering the second data by selecting a second sub-set of fields of the second common fields to form second filtered data, wherein filtering the second data includes accessing in dynamic memory the second data stored as in-flight data, wherein the first filtered data and the second filtered data are generated simultaneously by separate nodes in a network and reside in dynamic memory as in-flight data;

applying rules to the first filtered data and the second filtered data at the separate nodes in the network in real-time to identify selected real-time events stored in dynamic memory as in-flight data; and reporting the selected real-time events prior to persistently storing the first filtered data, the second filtered data and the selected real-time events.

2. The method of claim 1 wherein the first filtered data and the second filtered data are each represented as an object with a unique global identifier field, a creation time field and a payload field.

3. The method of claim 2 wherein the first filtered data and the second filtered data are each represented as an object with a location field.

4. The method of claim 2 wherein the first filtered data and the second filtered data are each represented as an object with a context field defining one or more key value pairs.

5. The method of claim 2 wherein the first filtered data and the second filtered data are each represented as an object with an event field defining one or more events.

6. The method of claim 1 further comprising persistently storing the first data, the second data, the first filtered data, the second filtered data and the selected real-time events to form aggregated data.

7. The method of claim 6 further comprising querying the aggregated data.

8. The method of claim 6 further comprising continuously loading the aggregated data in a Not Only SQL database.

9. The method of claim 1 further comprising forming a new dimension of data based upon selected fields of the first filtered data and the second filtered data.

10. The method of claim 1 wherein the first data source and the second data source are selected from a database log, database redo log, operating system log, application log, web server log, application server log, machine generated log and a sensor.

11. A system, comprising:
a first data source that continuously generates a first set of records with first common fields; wherein the first set of records characterize a first real-time event;
a second data source that continuously generates a second set of records with second common fields, wherein the second set of records characterize a second real-time event different than the first real-time event;
a first data processor to filter the first data by accessing the first data stored in dynamic memory as in-flight data and selecting a first sub-set of fields of the first common fields to form first filtered data stored in dynamic memory as in-flight data; and
a second data processor to filter the second data by accessing the second data in dynamic memory as in-flight data and selecting a second sub-set of fields of the second common fields to form second filtered data stored in dynamic memory as in-flight data, wherein the first data processor and the second data processor are on separate nodes in a network, and apply rules to the first filtered data and the second filtered data in real-time to identify and report selected real-time events stored in dynamic memory as in-flight data prior to persistently storing the first filtered data, the second filtered data and the selected real-time events.

12. The system of claim 11 wherein the first filtered data and the second filtered data are each represented as an object with a unique global identifier field, a creation time field and a payload field.

13. The system of claim 12 wherein the first filtered data and the second f data are each represented as an object with a location field.

14. The system of claim 12 wherein the first filtered data and the second filtered data are each represented as an object with a context field defining one or more key value pairs.

15. The system of claim 12 wherein the first filtered data and the second filtered data are each represented as an object with an event field defining one or more events.

16. The system of claim 11 further comprising:
an in-memory cache for volatilely storing the first data, the second data, the first filtered data, the second filtered data and the selected real-time events; and
a persistent data store for persistently storing the first data, the second data, the first filtered data, the second filtered data and the selected real-time events.

17. The system of claim 16 further comprising a query engine to support search, analytics, and visualization of data in the in-memory cache and persistent data store.

18. The system of claim 16 wherein the persistent data store is a Not Only SQL database.

19. The system of claim 11 further comprising a data aggregator to form a new dimension of data based upon selected fields of the first filtered data and the second filtered data.

20. The system of claim 11 wherein the first data source and the second data source are selected from a database log, database redo log, operating system log, application log, web server log, application server log, machine generated log and a sensor.

* * * * *